United States Patent
Harrison et al.

(10) Patent No.: US 9,036,373 B2
(45) Date of Patent: May 19, 2015

(54) CLOSED LOOP CONTROL OF A CYCLO-CONVERTER

(75) Inventors: Michael John Harrison, Christchurch (NZ); Huaqiang Li, Mendham, NJ (US); Tomasz Kotula, Christchurch (NZ); Yakov Familiant, Milwaukee, WI (US)

(73) Assignee: Eaton Industries Company, Christchurch (NZ)

( * ) Notice: Subject to any disclaimer, the term of this patent is extended or adjusted under 35 U.S.C. 154(b) by 327 days.

(21) Appl. No.: 13/805,427

(22) PCT Filed: Jun. 15, 2011

(86) PCT No.: PCT/NZ2011/000108
§ 371 (c)(1),
(2), (4) Date: Apr. 11, 2013

(87) PCT Pub. No.: WO2012/002824
PCT Pub. Date: Jan. 5, 2012

(65) Prior Publication Data
US 2013/0194844 A1 Aug. 1, 2013

(30) Foreign Application Priority Data
Jun. 29, 2010 (NZ) ........................................ 586492

(51) Int. Cl.
*H02M 3/335* (2006.01)
*H02M 7/72* (2006.01)
(Continued)

(52) U.S. Cl.
CPC .............. *H02M 7/72* (2013.01); *H02M 1/4258* (2013.01); *H02M 5/271* (2013.01); *Y02B 70/126* (2013.01)

(58) Field of Classification Search
USPC ........ 363/16–20, 21.03, 37–40, 56.01–56.02, 363/97–98, 131–132; 318/706, 721, 723, 318/798, 254
See application file for complete search history.

(56) References Cited

U.S. PATENT DOCUMENTS 3,959,720 A    5/1976 Bose et al.
4,719,550 A *  1/1988 Powell et al. .................. 363/37
(Continued)

FOREIGN PATENT DOCUMENTS

EP      1 956 701 A1    8/2008
WO    WO 2008/018802    2/2008

OTHER PUBLICATIONS

Fairchild Semiconductor, "Half-Bridge LLC Resonant Converter Design Using FSFR-Series Fairchild Power Switch (FPS™)", http://www.fairchildsemi.com, 2007.
(Continued)

*Primary Examiner* — Rajnikant Patel
(74) *Attorney, Agent, or Firm* — Myers Bigel Sibley & Sajovec, P.A.

(57) ABSTRACT

A three-phase resonant cyclo-converter including a closed loop control module for controlling the switching frequency of the cyclo-converter, the closed loop control module including: a voltage signal development module arranged to develop a voltage signal representative of a voltage output waveform of the cyclo-converter, a storage module arranged to accumulate voltage signal values for phase portions of the voltage output waveform, where the voltage signal values are based on a voltage error signal and accumulated historical voltage signal values for the same corresponding phase portions, and a switching frequency control module arranged to develop a switching frequency control signal to control the switching frequency of the cyclo-converter based on the accumulated voltage signal values for corresponding phase portions of the voltage output waveform, and a proportional voltage signal based on a difference between the developed voltage signal and a reference voltage signal.

31 Claims, 4 Drawing Sheets

(51) Int. Cl.
*H02M 1/42* (2007.01)
*H02M 5/27* (2006.01)

(56) References Cited

U.S. PATENT DOCUMENTS

| | | | |
|---|---|---|---|
| 5,010,471 A | | 4/1991 | Klaassens et al. |
| 5,920,162 A | * | 7/1999 | Hanson et al. ............ 318/400.04 |
| 5,942,818 A | * | 8/1999 | Satoh et al. ...................... 310/46 |
| 5,969,509 A | * | 10/1999 | Thorvaldsson ............... 323/210 |
| 8,861,231 B2 | * | 10/2014 | Cross et al. ...................... 363/35 |
| 2008/0272756 A1 | | 11/2008 | Melanson |
| 2009/0323380 A1 | | 12/2009 | Harrison |

OTHER PUBLICATIONS

Huisman H. "A Multiphase Series-Resonant Converter with a New Topology and a Reduced Number of Thyristors", *IEEE Transactions on Power Electronics*, vol. 10, No. 1, Jan. 1995, 86-93.

International Search Report Corresponding to International Application No. PCT/NZ2011/000108; Date of Mailing: Apr. 4, 2012; 4 Pages.

Lander, Cyril "Power Electronics, Frequency Conversion", Power Electronics, McGraw-Hill, GB, Jan. 1, 1993, pp. 181-191.

Mingping Mao et al., "Analysis and Design of a 1 MHz LLC Resonant Converter with Coreless Transformer Driver", International Conference & Exhibition for Power Electronics, China, 2007, 6 pages.

* cited by examiner

CLOSED LOOP CONTROL OF A CYCLO-CONVERTER

RELATED APPLICATIONS

The present application is a 35 U.S.C. §371 national phase application of PCT International Application No. PCT/NZ2011/000108, having an international filing date of Jun. 15, 2011, claiming priority to New Zealand Patent Application No. 586492, filed Jun. 29, 2010. The disclosures of each application are incorporated herein by reference in their entireties. The above PCT International Application was published in the English language and has International Publication No. WO 2012/002824.

FIELD OF THE INVENTION

The present invention relates to the closed loop control of a cyclo-converter. In particular, the present invention relates to a three-phase resonant cyclo-converter and a method of controlling a three-phase resonant cyclo-converter that includes proportional and integral switching frequency control.

BACKGROUND

Many different industries require power supplies for supplying constant power based on a three-phase power source.

Cyclo-converters have been developed for use in efficient power supplies in order to provide a number of improvements over conventional rectifier power supplies and two stage power supplies.

A cyclo-converter provides an efficient single stage power converter. A benefit of adopting single stage power conversion is based on the fact that a single stage converter will have an efficiency similar to the efficiency of either of the individual stages of a conventional two-stage rectifier (e.g. 96%). In other words the losses from a single-stage converter are only half of that of a two-stage converter. This greater efficiency (lower losses) leads to a corresponding decrease in the size of components within the rectifier and hence a smaller product that costs less to produce. Other benefits are obtained by virtue that the exhaust air heat from the converter will be lower for a given system power (easing power system design) and in the fact that a single-stage converter can be realised with considerably fewer components than a conventional two-stage rectifier design.

The present applicants have developed a unique three-phase resonant cyclo-converter configuration as described in PCT publication WO2008/018802, which is hereby incorporated by reference.

This present application relates to an improved method (and associated control system) for controlling a three-phase resonant cyclo-converter, such as the type described in WO2008/018802. It will be appreciated that although power converters such as those described in WO2008/018802 are particularly useful in the telecommunication industry that they may also equally be applicable in other industries.

WO2008/018802 has suggested that proportional and integral feedback elements based on the measured output voltage of the cyclo-converter may be used to control the cyclo-converter's switching frequency. These proportional and integral feedback elements may enable the switching frequency to be adjusted so that the output voltage of the cyclo-converter may be adjusted accordingly.

Embodiments of the present invention provide an improved mechanism for controlling a three phase resonant cyclo-converter switching frequency throughout the full phase of an input power signal.

An object of the present invention is to provide improved control over existing three-phase resonant cyclo-converters.

A further object of the present invention is to provide improved control of a three-phase resonant cyclo-converter over the full phase of an input power signal.

Each object is to be read disjunctively with the object of at least providing the public with a useful choice.

The present invention aims to overcome, or at least alleviate, some or all of the afore-mentioned problems.

SUMMARY OF THE INVENTION

It is acknowledged that the terms "comprise", "comprises" and "comprising" may, under varying jurisdictions, be attributed with either an exclusive or an inclusive meaning. For the purpose of this specification, and unless otherwise noted, these terms are intended to have an inclusive meaning—i.e. they will be taken to mean an inclusion of the listed components which the use directly references, and possibly also of other non-specified components or elements.

According to one aspect, the present invention provides a three-phase resonant cyclo-converter comprising a closed loop control module for controlling the switching frequency of the cyclo-converter, the closed loop control module comprising: a voltage signal development module arranged to develop a voltage signal representative of a voltage output waveform of the cyclo-converter, a storage module arranged to accumulate voltage signal values for phase portions of the voltage output waveform, where the voltage signal values are based on a voltage error signal and accumulated historical voltage signal values for the same corresponding phase portions, and a switching frequency control module arranged to develop a switching frequency control signal to control the switching frequency of the cyclo-converter based on the accumulated voltage signal values for corresponding phase portions of the voltage output waveform, and a proportional voltage signal based on a difference between the developed voltage signal and a reference voltage signal.

According to a further aspect, the present invention provides a method of controlling a three-phase resonant cyclo-converter, the method comprising the steps of: developing a voltage signal representative of a voltage output waveform of the cyclo-converter, accumulating voltage signal values for phase portions of the voltage output waveform, where the voltage signal values are based on a voltage error signal and accumulated historical voltage signal values for the same corresponding phase portions, and developing a switching frequency control signal to control the switching frequency of the cyclo-converter based on the accumulated voltage signal values for corresponding phase portions of the voltage output waveform, and a proportional voltage signal based on a difference between the developed voltage signal and a reference voltage signal.

According to particular embodiments of the present invention an improved control mechanism for three phase resonant cyclo-converters is provided.

BRIEF DESCRIPTION OF THE DRAWINGS

Embodiments of the present invention will now be described, by way of example only, with reference to the accompanying drawings, in which.

DETAILED DESCRIPTION OF THE INVENTION

First Embodiment

According to various embodiments of the present invention, a method for developing a switching frequency control signal based on a cyclo-converter output voltage is described. The described method may be implemented in a three phase resonant cyclo-converter and is used to control the output voltage of such a cyclo-converter.

The cyclo-converter circuit arrangement will now be described with reference to FIG. 1.

Figure 1:
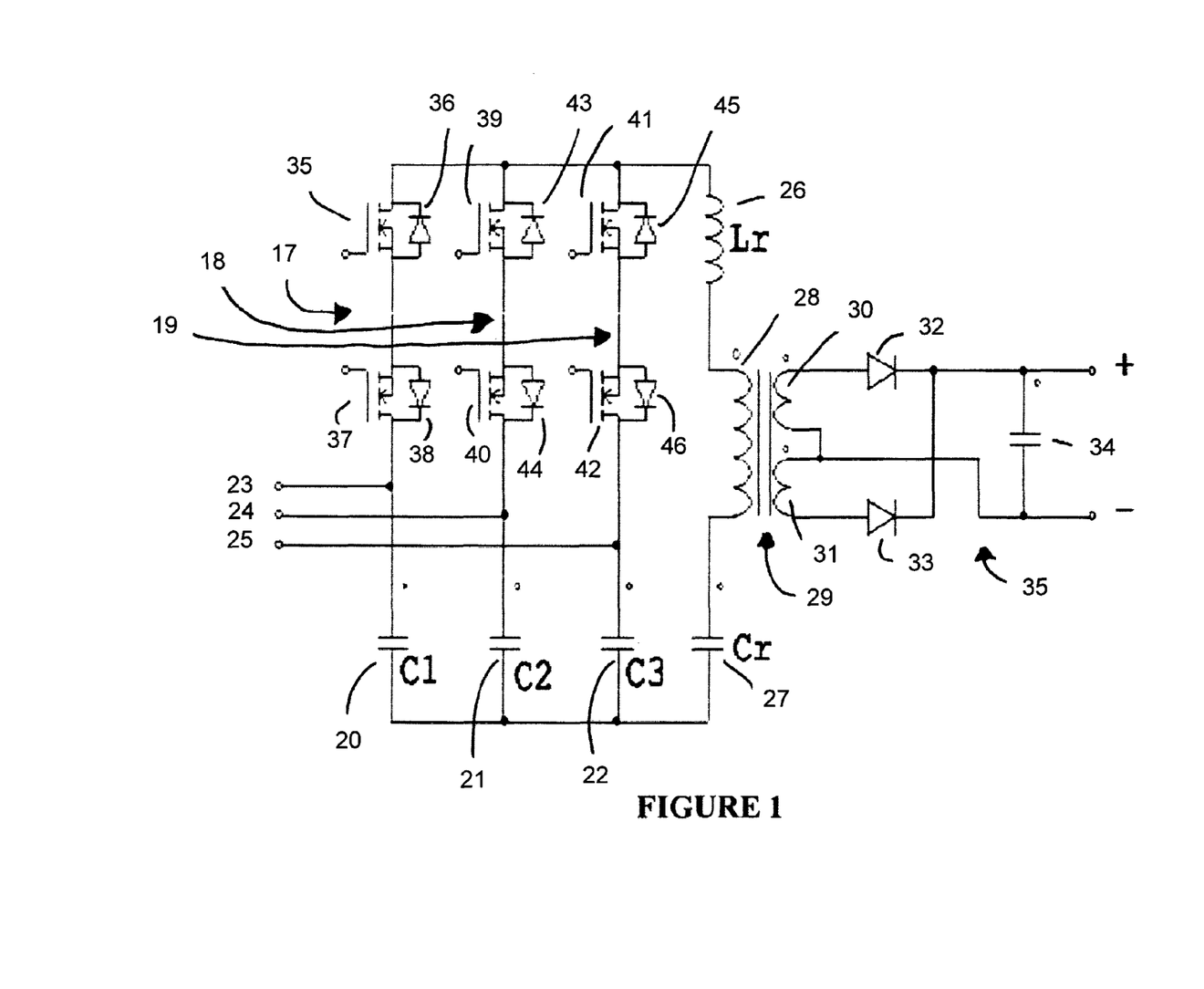
FIG. 1 shows a known three phase resonant cyclo-converter circuit which is controlled according to an embodiment of the present invention.

FIG. 1 shows a three phase resonant cyclo-converter circuit in the form of a half bridge which uses a control method according to this first embodiment.

It will be understood that this embodiment and other embodiments of the present invention may also be applied to a full bridge cyclo-converter.

The cyclo-converter of FIG. 1 includes bidirectional switches 17 to 19 and capacitors 20 to 22 forming the half bridge. Switch 17 consists of MOSFET 35 in parallel with body diode 36 in series with MOSFET 37 in parallel with body diode 38. Switch 17 has four states:
1. on (MOSFETs 35 and MOSFET 37 on);
2. off (MOSFET's 35 and 37 off)
3. forward diode (MOSFET 37 on switching in body diode 36)
4. reverse diode (MOSFET 35 on switching in body diode 38)

Switches 18 and 19 are similarly configured. By utilizing the four switching states full resonant switching can be achieved as will be described.

Three phase supply lines 23 to 25 provide a three phase AC supply to the half bridge. The output of the cyclo-converter drives an LLC resonant circuit consisting of inductor 26, capacitor 27 and primary coil 28 of transformer 29. Output coils 30 and 31 are connected via diodes 32 and 33 and capacitor 34 to form half bridge rectifier 35.

Inductor 26 and capacitor 27 form the series-resonant circuit. To achieve low load output voltage regulation the resonant circuit can be easily transformed from a simple LC resonant circuit into an LLC resonant circuit by gapping the core of the main transformer 29. The primary method of output voltage control is achieved by variable frequency control.

The switching sequence of a three phase resonant cyclo-converter will now be described with reference to FIG. 2.

According to this embodiment, the switching frequency of the cyclo-converter is a high frequency. That is, the switching frequency for this embodiment is approximately 100 kHz. However, it will be understood that, as an alternative, other lower or higher switching frequencies may be used.

To achieve the requirements to enable resonant switching the transistors are always sequenced in the order that results in the largest voltage magnitude (L) mains phase transistor being switched on first, followed by the mains phase that has the medium voltage magnitude (M), then finally the mains phase with the smallest mains voltage magnitude (S). This sequencing is repeated indefinitely (L, M, S, L, M, S, . . . ) with a sub-microsecond dead-time to allow for the resonant load voltage commutation. Since the mains instantaneous input voltages are continually changing the sequencing logic responsible for driving the individual transistors reverses the transistor sequencing order every 30 degrees of mains input.

Figure 2:
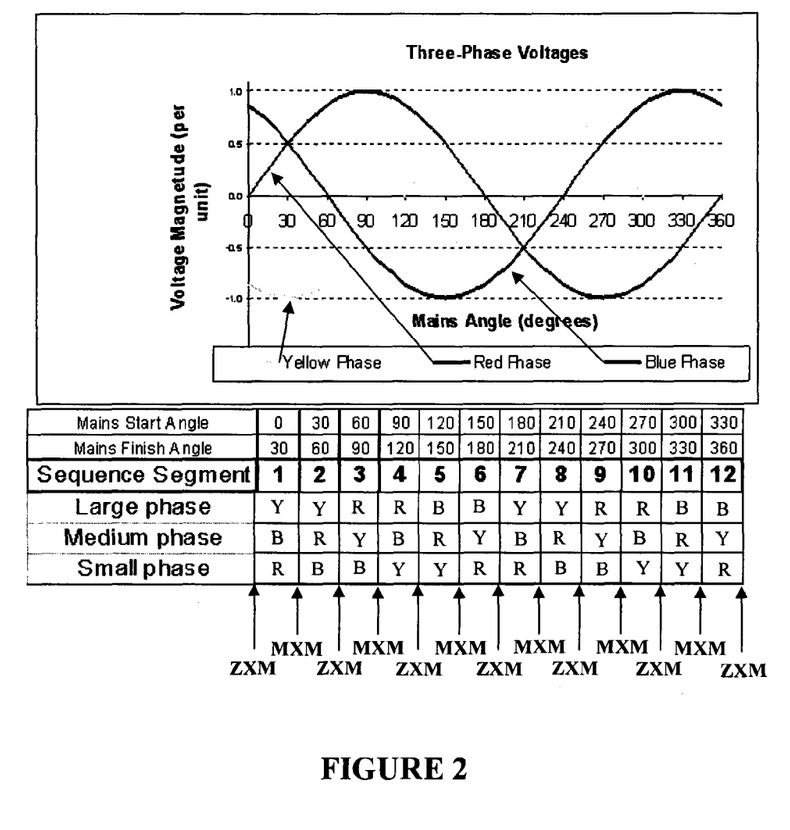
FIG. 2 shows a switching sequence of a three phase resonant cyclo-converter which is controlled according to an embodiment of the present invention.

FIG. 2 shows the three phase mains instantaneous voltages (Yellow, Blue and Red) over a single mains cycle and the table immediately below the graph shows a logic table that signifies the function of each of the six transistors during each of the 12 mains 30-degree segments:

"Large phase (L)"—The transistor that is controlling the flow of current from the mains phase with the largest voltage magnitude through to the resonant load, transformer, and ultimately the output of the rectifier.

"Medium phase (M)"—The transistor that is controlling the flow of current from the mains phase with the medium voltage magnitude through to the resonant load, transformer, and ultimately the output of the rectifier.

"Small phase (S)"—The transistor that is controlling the flow of current from the mains phase with the smallest voltage magnitude through to the resonant load, transformer, and ultimately the output of the rectifier.

The references Y, B and R in the logic table indicate which of the three mains phase instantaneous voltages Yellow, Blue or Red are the relevant voltage for the indicated phase (L, M or S).

This resonant switching sequence results in sine-wave current flow through the transistors and output rectifier diodes, such that the current has almost returned to zero when each switching transition occurs. This reduces the switching losses in both the transistors and output diodes and allows for either MOSFET or IGBT switching transistors to be used. If IGBT transistors are used anti-parallel diodes may be employed to allow a reverse current path (emitter to collector).

A brief discussion of the various modes of the cyclo-converter is now provided. In FIG. 2, ZXM indicates the position where the zero-cross mode is activated and MXM indicates the position where the magnitude-cross mode is activated, as described below.

Since it becomes impractical to try and turn a transistor on then off again in an extremely small time period, there comes a point (near each mains voltage zero crossing) where there is no benefit in trying to turn the S transistor on. Hence for a period that starts a few degrees before each mains zero crossing and extends to a few degrees after the mains zero crossing the cyclo-converter may operate in a two-phase mode. This mode is referred to as a "zero-cross mode" and during this mode of operation the high frequency switching sequence is simply L, M, L, M, L, M . . .—where only the L and M transistors are switched on and the S transistor remains off. During this "zero-cross mode" the transistor on-times for both the L and the M transistor are equal.

A different issue arises in maintaining the normal L, M, S, L, M, S . . . high frequency switching sequence at the mains voltage magnitude crossing point. At every mains magnitude cross point the M and S phase voltages swap over and hence the definitions of M and S must also swap. If the rate of change of the mains phase voltages is considered with respect to the high frequency switching frequency of the cyclo-converter it becomes clear that the concept of the M and S phase voltages crossing over at a particular instance in time is far from the reality. The rate of change of the mains phase voltages is so slow that for many high frequency switching cycles the M and the S phase voltages are effectively equal. What's more, when real world effects like noise are considered it can also be appreciated that the converter may actually operate for several high frequency switching cycles with incorrect M and S definitions. For example, the voltage on the phase we are calling S is actually greater (by a very small amount) than the voltage on the phase we are calling M. This error in the definition of the M and S phases causes the wrong transistor switching sequence which in turn leads to considerable current flowing from M to S mains phase (or S to M mains phase depending on relative voltage polarities. By changing the high frequency switching sequence used when the cyclo-converter is operating near to a mains voltage magnitude cross point this problem may be avoided.

Therefore, for a period that starts a few degrees before each mains magnitude crossing and extends to a few degrees after the mains magnitude crossing the cyclo-converter may operate in an interleaved mode. This mode is referred to as a "magnitude-cross mode" and during this mode the high frequency switching sequence is simply L, M, L, S, L, M, L, S, . . .—where the M and S transistors are alternately switched on between each time the L transistor is switched on. During this "magnitude-cross mode" the transistor on-times for the L, M, and S transistors are all equal.

Thus the cyclo-converter uses three different high frequency switching sequences: "zero-cross mode"—used near to mains phase zero crossings "Three-phase mode"—the normal mode used the majority of the time "magnitude-cross mode"—used near to mains phase magnitude crossings.

During the switching of the cyclo-converter arrangement discussed above a $6^{th}$ harmonic component is produced. By applying a feedback loop that only utilises the proportional and derivative feedback terms, the $6^{th}$ harmonic is not removed. Therefore, methods are described herein which relate to using an improved feedback system that utilises an integral feedback term to remove the $6^{th}$ harmonic.

Specific methods are also described for controlling the output voltage signal of a cyclo-converter. In particular, the control mechanisms are used to monitor and control the voltage output of the cyclo-converter over 30 degree segments of the 360 degree range of the three phase supply.

At a mains Zero Cross point (ZeroX) the phases being switched have voltages of +/−0.866 peak. At a mains Magnitude Cross point (MagX) the phases being switched have voltages of −0.5 and +1.0 peak (or alternatively +0.5 and −1.0 peak).

Further, the output voltage of the cyclo-converter may vary from +/−0.75 peak to +/−0.866 peak (when coupled through a capacitor) in the magnitude cross mode and zero cross modes respectively.

This would result in the output voltage from the cyclo-converter varying considerably over the full 360 degree range. Therefore, in order to more accurately control the output voltage of the cyclo-converter over the entire 360 degree period, the previous and current voltages being compared by the closed loop control mechanism are taken from similarly positioned segments in the 360 degree cycle. This enables the control feedback loop to compare aligned slices of the voltage output over time.

Figure 3:
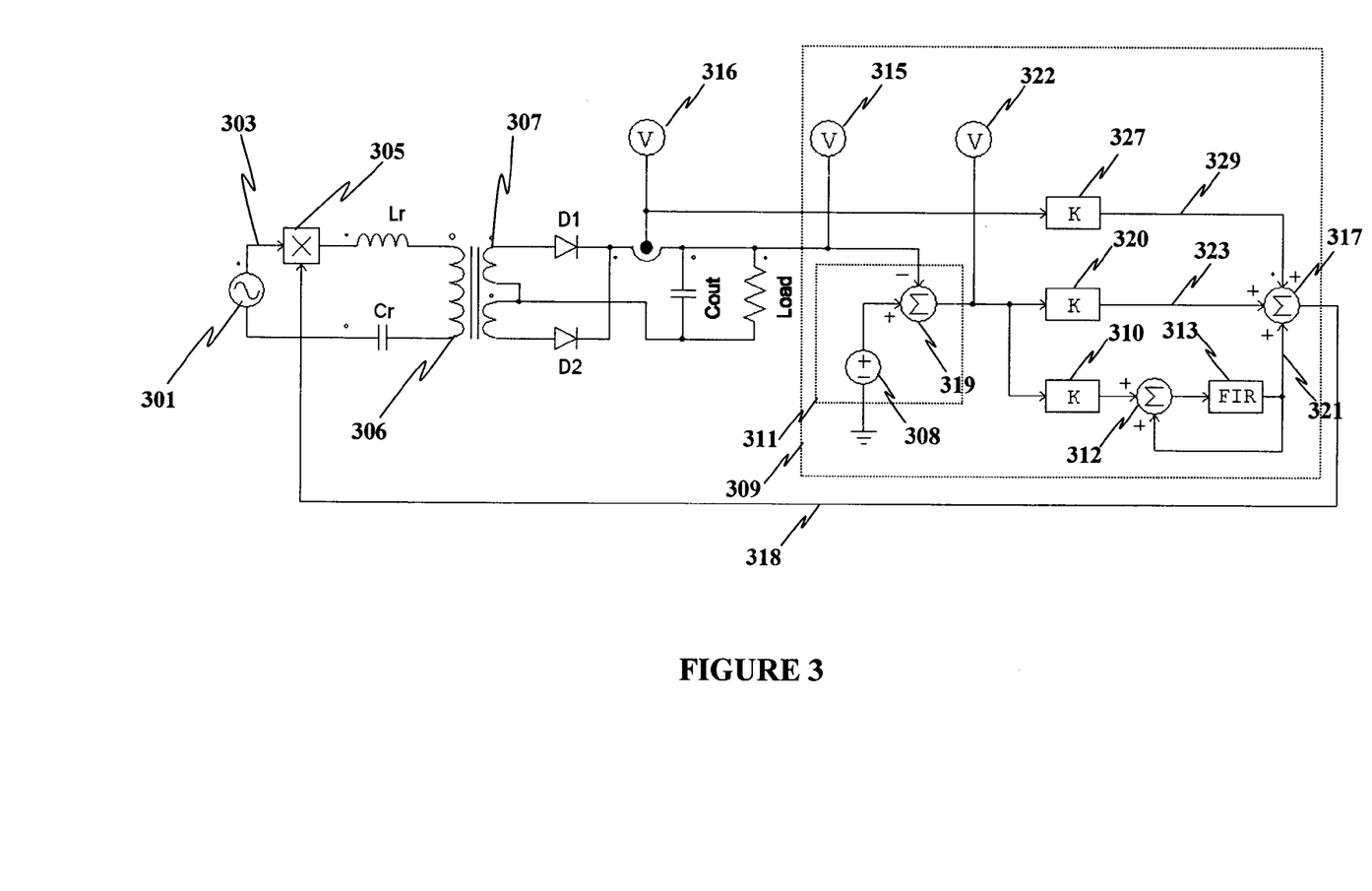
FIG. 3 shows a system block diagram of a control mechanism according to an embodiment of the present invention.

FIG. 3 shows a system block diagram of various components that are arranged to provide this closed loop control mechanism.

A three phase power supply 301 provides three-phase power via three voltage phase lines 303 to a cyclo-converter 305. According to this embodiment, the cyclo-converter is as shown in FIG. 1. However, it will be understood that any other suitable type of three phase resonant cyclo-converter may be controlled in a similar manner as described herein.

The cyclo-converter output is a sinusoidal voltage output waveform, which is fed to an LLC resonant circuit, which includes a resonant Inductor (Lr), a resonant capacitor (Cr) and a primary coil 306 of the output transformer.

The secondary coil 307 of the transformer feeds the two diodes D1 and D2 also shown in FIG. 1.

A voltage output waveform taken across the load on the secondary side of the transformer Vout is used by a closed loop control module 309 to develop a voltage error signal Verror 322.

It will be understood that the voltage output of the cyclo-converter may be taken from several different points. According to this embodiment, the voltage output of the cyclo-converter is measured across the load placed across the secondary side of the transformer as shown in FIG. 3. That is, the transformer that is connected to the output of the cyclo-converter. Alternatively, the voltage signal output from the cyclo-converter may be measured directly from the cyclo-converter output across the primary side of the transformer.

The closed loop control module 309 includes a voltage signal error module 311, an integral gain module 310, an accumulation module 312 and a storage module 313, which in this embodiment forms part of a Finite Impulse Response (FIR) filter. The closed loop control module 309 further includes a switching frequency control module 317, a proportional gain module 320 and a derivative gain module 327.

The voltage signal error module 311 includes a voltage reference generator 308 and a voltage error generator 319, which is arranged to develop an error signal Verror based on a difference between the output voltage 315 of the cyclo-converter and a voltage reference value Vref generated by the voltage reference generator 308. Vref is the desired output voltage for the power converter.

The error signal Verror is fed through an integral gain module 310 and is then added to, combined or accumulated with historic voltage signal values from the storage module 313 using an accumulation module 312 for the same corresponding portion of the output voltage waveform, where the result from the accumulation module 312 is used as an input to the storage module 313 (FIR filter).

Therefore, the storage module 313 is arranged to store error corrected historic voltage signal values for specific portions of the output voltage waveform. That is, the error corrected historic voltage signal values are stored as new voltage signal values within the storage module 313 for the relevant portion of the output voltage waveform.

Values within the storage module 313 are output via an internal process module that is arranged to produce an integral voltage control signal 321 based on the historic voltage signal values, as will be explained in more detail below.

Therefore, the integral voltage control signal 321 is developed based on historical voltage values and a voltage error signal for the same relative segment of the voltage waveform in the voltage waveform cycle, as will be explained in more detail with reference to FIG. 4.

The voltage error signal Verror is also provided to a proportional gain module 320 to develop a proportional voltage control signal 323. The proportional voltage control signal 323 is a direct proportional measure of the output voltage Vout.

According to this embodiment, the measured or derived output voltage is measured directly across a load placed on a secondary side of a transformer in connection with an output of the cyclo-converter, i.e. a voltage signal developed from the secondary side of an isolation transformer placed on the output of the cyclo-converter is fed back to the control circuit.

It will be understood that, as an alternative, the output voltage may be measured using other techniques. For example, the load voltage may be measured immediately after the rectifier diodes on the output of the cyclo-converter.

Optionally, a derivative voltage control signal 329 is also developed using a load current development module, which in this embodiment is in the form of a derivative gain module 327. According to this embodiment, the "derivative voltage" signal is developed by directly measuring the load current 316 using a current sensor on the secondary side of the cyclo-converter output transformer. As can be seen in FIG. 3 the load current is sensed on the cathode side of rectifier diodes D1 & D2.

As an alternative, the resonant current on the primary side of the cyclo-converter output transformer may be used to develop the load current. That is, the load current development module may sense the resonant current iRes using a current sensor attached to the primary coil 306 of the transformer located on the output of the cyclo-converter. The resonant current iRes is considered an accurate representation of the output current of the transformer as the output capacitance on the secondary side of the transformer (which forms part of the half bridge rectifier) dominates the circuit (i.e. the load is effectively resistive).

The output current of the transformer is considered to be the derivative of the output voltage. Therefore, the measured load current Iout is used to develop the derivative voltage control signal 329 by passing the sensed load current through the derivative gain module 327.

The proportional, integral and derivative voltage control signals are provided to a switching frequency control module 317, which according to this embodiment is a PID controller. The PID controller develops a switching frequency control signal 318 based on the combination of the proportional, integral and derivate control signals. This switching frequency control signal 318 is used to control the switching frequency of the cyclo-converter 305. The change in switching frequency varies the voltage output due to the resonant circuit being controlled on a different part of the circuit's transfer characteristics.

According to this embodiment, the switching frequency control module is arranged to adjust a switching frequency period of the switching frequency for a phase of an input voltage waveform having the greatest absolute voltage to achieve frequency control. That is, the L on time is adjusted to change the overall switching frequency period and thus the switching frequency of the cyclo-converter.

It will be understood that, as with any control system, there is a general trade off between performance and complexity of implementation. Therefore, the system may be adjusted or controlled so that it operates under proportional only control, proportional and integral control, or proportional, integral and derivative control, depending on the requirements of the power supply.

Figure 4:
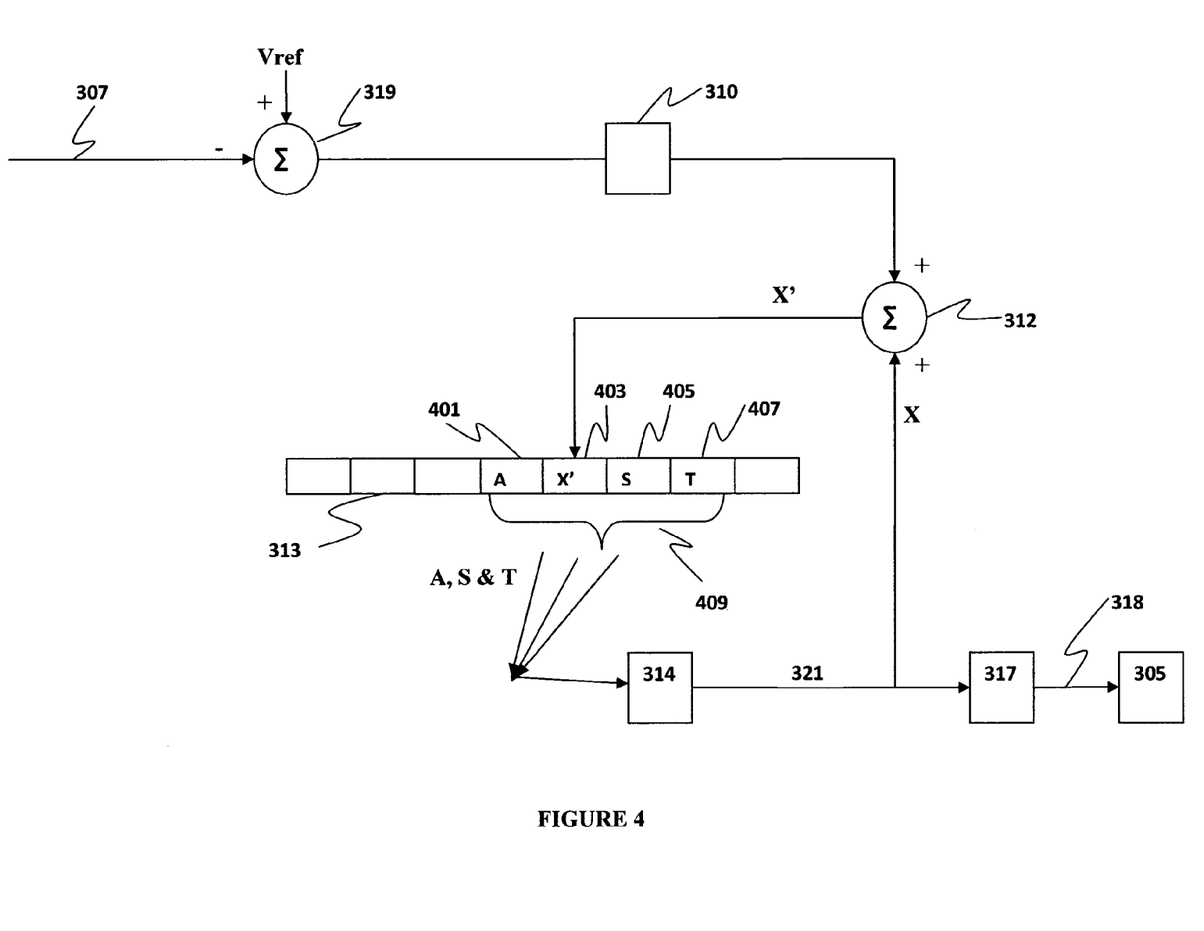
FIG. 4 shows a block diagram of an integrating module according to an embodiment of the present invention.

FIG. 4 shows further details of an integrating module according to this embodiment. The integrating module includes the voltage signal error module 311, the integral gain module 310, the accumulation module 312 and the storage module 313 as described above.

The combination of the storage module 313, the process module 314 and the accumulation module 312 effectively provide a Finite Impulse Response (FIR) filter system.

The storage module 313 includes a number of storage elements (401, 403, 405, 407) that are used to store the historical voltage values (A, S, T). The storage elements cover a full 360 degree phase range of the output voltage waveform. According to this embodiment, each element is used to store an output voltage signal that represents 5 degrees of the full 360 degree range. Therefore according to this embodiment, there are 72 storage elements used to store the output voltage signal values for different phase segments of the output voltage waveform. That is, the FIR buffer (storage module) is able to "learn" the required control output for each and every point during the mains cycle.

As an alternative, more storage elements may be used to increase the resolution at which the output voltage values are stored. For example, each storage element may store an output voltage signal that represents 1, 2, 3 or 4 degrees of the full 360 degree range. Alternatively, each storage element may store an output voltage signal that represents an even higher resolution at anywhere in between 0.1 and 1 degree of the full 360 degree range. It will be understood that other alternatives may be used around these range values to determine the resolution of the phase segments being stored in the storage elements.

During a particular phase portion of the voltage output waveform, a window 409 of the phase segments stored in the storage module are analysed. The window in this case covers the values A, X', S & T.

The value X' is the value currently being determined for this phase portion of the output voltage waveform.

The value A represents a historical voltage value and is the voltage value that was previously entered into the storage module in segment 401 during the immediately previous processing step. The value A corresponds to a similar phase portion of the output voltage waveform that immediately lags the current phase portion of the output voltage waveform that is being processed.

The values S and T are also historical voltage values that were previously entered into the storage module in storage elements 405 and 407 respectively when the system was processing a similar phase portion of the output voltage waveform that immediately leads the current phase portion being processed. The value S is the value that will be overwritten during the subsequent processing step, and the value T is the value that will be overwritten in the step following the subsequent processing step.

The process module 314 retrieves the values A, S and T for the current window of phase segments. The process module applies a weighting value to each of the three retrieved values. According to this embodiment, the immediately previous value A has a weighting value of 2 applied to it, whereas the historical values S & T have a weighting value of 1 applied to them. Therefore, A has a different weighting value applied to it than the values S and T. In this embodiment, the weighting value applied to A is greater than the weighting values applied to S & T.

The process module determines the average of these three weighted values by adding the values together and dividing the total by the total weighting value for A, S & T, i.e. by four in this embodiment as A has a weighting of 2 and S & T each have a weighting of 1. Therefore, an average weighted value (X) for the current window is provided by calculating the sum of weighted A, S & T and dividing by four. The average weighted value (X) is the integrated voltage control signal 321. It is this average weighted value that is fed back to the accumulation module 312 to be combined with the voltage error signal for the current segment of the output voltage waveform.

It will be understood that more or less stored voltage values may be used to determine the average during the current window being processed. It will also be understood that different weighting values may be applied to each of the stored values or to specific elements in the storage module, or that the weighting values may be adapted or adjusted overtime. It will be understood that there is a trade off between complexity and accuracy with the weighting values used and that a scheme that uses simple integral weighting factors can result in faster execution speed in a microprocessor.

The voltage signal error module 311 compares the voltage output waveform for a particular phase portion with the voltage reference value Vref to develop an error signal value Verror.

The integrated voltage control signal 321 is fed into the accumulation module 312 which adds the error signal value output from the voltage signal error module 311 to the integrated voltage control signal 321. The sum of the error signal and integrated term is then stored in the storage module as X' in the current phase segment storage element 403 of the window.

Once the system has processed this current phase segment by storing the value X' in storage element 403, the window is shifted by one phase segment to align with the shift of the voltage output waveform. It will be understood that any suitable method may be used to detect a shift in the voltage output waveform in order to align the phase window in the storage module. For example, the phase of the voltage output waveform may be monitored by a phase locked loop module (not shown) to ensure the storage module is in sync with the voltage output.

Therefore, the integral term is generated from error corrected averaged voltage values accumulated over time for relative portions of the output waveform. The integrated voltage signal is specifically developed using a synchronous FIR filter application. The input to the FIR filter is developed by adding a voltage error signal to the integral term. The voltage error signal is developed from the difference between the measured output voltage and a reference voltage signal.

The integrated voltage signal is developed from the FIR filter by applying weights to historical voltage signal values. These historical voltage signal values are stored in the FIR buffer and include immediate past (in terms of relative phase position in the buffer and on the voltage waveform) historical values and subsequent future (in terms of relative phase position in the buffer and on the voltage waveform) historical values.

These historical values cover a phase portion of the output voltage waveform. For example, the phase portion may relate to between 1 and 30 degrees of the output voltage waveform. Each historical value is stored in a single segment of the storage module for that phase portion. For example, the segment may relate to between 0.1 and 5 degrees of the output voltage waveform. As the output voltage waveform phase changes, so does the phase window in which the integral value is calculated from the historical values. That is, the phase window shifts in sync with the output voltage waveform to ensure like for like phases are compared to develop the integral signal.

The immediate past historical values are stored in segments of the buffer that were only just previously filled with the error adjusted (i.e. "average+error term") voltage signal. The subsequent future historical values are stored in segments of the buffer that were filled when last analysing the voltage waveform at that relative phase, i.e. almost one phase period previously. The immediate past and subsequent future historical values are weighted, summed and averaged to produce the current "average" integrated voltage signal. The resultant "average" signal, i.e. the integral term, is then added to the current voltage error term and placed into the FIR buffer in the current segment of the phase portion.

The integral control signal is fed into a PID controller as described above in order to produce a switching frequency control signal 318 which is used to control the switching frequency of the cyclo-converter and thus the output voltage.

This method and associated control system therefore provides control over the full phase of the input power signal by taking into account previously recorded values for the same or similar phase portion.

It will be understood that the embodiments of the present invention described herein are by way of example only, and that various changes and modifications may be made without departing from the scope of invention.

The invention claimed is:

1. A three-phase resonant cyclo-converter including a closed loop control module for controlling the switching frequency of the cyclo-converter, the closed loop control module including:
   a voltage signal development module arranged to develop a voltage signal representative of a voltage output waveform of the cyclo-converter;
   a storage module arranged to accumulate voltage signal values for phase portions of the voltage output waveform, where the voltage signal values are based on a voltage error signal and accumulated historical voltage signal values for the same corresponding phase portions; and
   a switching frequency control module arranged to develop a switching frequency control signal to control the switching frequency of the cyclo-converter based on the accumulated voltage signal values for corresponding phase portions of the voltage output waveform, and a proportional voltage signal based on a difference between the developed voltage signal and a reference voltage signal.

2. The cyclo-converter of claim 1, wherein the phase portions are within a range from 1 degree to 30 degrees.

3. The cyclo-converter of claim 1, wherein the switching frequency control module is further arranged to adjust a switching frequency period for a phase of an input voltage waveform having the greatest absolute voltage to achieve frequency control.

4. The cyclo-converter of claim 1, wherein the storage module is arranged to develop an integrated signal based on the accumulated voltage signal values for corresponding phase portions, where the switching frequency control signal is developed from the integrated signal.

5. The cyclo-converter of claim 4, wherein each corresponding phase portion is split into a plurality of phase segments, and the voltage signal value is stored in a window of phase segments such that the voltage signal value is stored next to one or more historical voltage signal values in neighboring phase segments within the window.

6. The cyclo-converter of claim 5, wherein an average of selected historical voltage signal values within the window is fed back to the storage module to develop the voltage signal value.

7. The cyclo-converter of claim 6, wherein the selected historical voltage signal values include a first historical voltage signal value positioned in a first phase segment which was previously used to store the voltage signal value and a
   second historical voltage signal value positioned in a second phase segment which is to be used subsequent to storing the voltage signal value.

8. The cyclo-converter of claim 7, wherein the first historical voltage signal value is given a different weighting to that of the second historical voltage signal value.

9. The cyclo-converter of claim 1, wherein the switching frequency control module further includes a PID control module arranged to develop a switching frequency control signal from proportional, integral and derivative voltage signals.

10. The cyclo-converter of claim 9, wherein the closed loop control module further includes a load current development module arranged to develop the derivative voltage signal based on a load current signal representative of an output load current.

11. The cyclo-converter of claim 9, wherein the PID controller is arranged to develop the proportional voltage signal based on a difference between the developed voltage signal and the reference voltage signal.

12. The cyclo-converter of claim 11, wherein the developed voltage signal is developed from a load voltage measured across a load placed on a secondary side of a transformer in connection with an output of the cyclo-converter.

13. The cyclo-converter of claim 12, wherein the load voltage is measured after rectifier diodes on the output of the cyclo-converter.

14. The cyclo-converter of claim 1 further including:
three phase inputs;
bidirectional switches between each input and a first output line;
capacitors between each input and a second output line; and
a controller arranged to control the switching of the bidirectional switches on the basis of the output voltage and/or input voltage.

15. The cyclo-converter of claim 14, wherein the controller is further arranged to control the switching frequency of the bidirectional switches in dependence upon the output of the cyclo-converter.

16. The cyclo-converter of claim 14, wherein the controller is further arranged to control the switching of the bidirectional switches to control the power transfer and power factor of the cyclo-converter in dependence upon the output of the cyclo-converter.

17. The cyclo-converter of claim 14, wherein the controller is further arranged to control a switching sequence of the bidirectional switches to provide control over the power transfer and power factor of the cyclo-converter.

18. A method of controlling a three-phase resonant cyclo-converter, the method including the steps of:
developing a voltage signal representative of a voltage output waveform of the cyclo-converter;
accumulating voltage signal values for phase portions of the voltage output waveform, where the voltage signal values are based on a voltage error signal and accumulated historical voltage signal values for the same corresponding phase portions; and
developing a switching frequency control signal to control the switching frequency of the cyclo-converter based on the accumulated voltage signal values for corresponding phase portions of the voltage output waveform, and a proportional voltage signal based on a difference between the developed voltage signal and a reference voltage signal.

19. The method of claim 18, wherein the phase portions are within a range from 1 degree to 30 degrees.

20. The method of claim 18, further including the step of adjusting a switching frequency period for a phase of an input voltage waveform having the greatest absolute voltage to achieve frequency control.

21. The method of claim 18, further including the step of developing an integrated signal based on the accumulated voltage signal values for corresponding phase portions, where the switching frequency control signal is developed from the integrated signal.

22. The method of claim 21, further including the step of applying a weighting to selected historical voltage signal values, where the weighting is based on the position of the selected historical voltage signal values within the phase portion relative to the position in which a current voltage signal value is stored.

23. The cyclo-converter of claim 21, wherein the developed integrated signal is an average value of stored historical voltage signal values for the corresponding phase portion.

24. The method of claim 21, further including the step of splitting each corresponding phase portion into a plurality of phase segments, wherein the voltage signal value is stored in a window of phase segments such that the voltage signal value is stored next to one or more historical voltage signal values in neighboring phase segments within the window.

25. The method of claim 24, wherein an average of selected historical voltage signal values within the window is used to develop the voltage signal value.

26. The method of claim 25, wherein the selected historical voltage signal values include a first historical voltage signal value positioned in a first phase segment which was previously used to store the voltage signal value and a second historical voltage signal value positioned in a second phase segment which is to be used subsequent to storing the voltage signal value.

27. The method of claim 26, wherein the first historical voltage signal value is given a different weighting to that of the second historical voltage signal value.

28. The method of claim 27, wherein the selected historical voltage signal values include a third historical voltage signal value positioned in a third phase segment adjacent the second phase segment, where the third phase segment is to be used subsequent to storing the voltage signal value in the second phase segment.

29. The method of claim 18, further including the step of controlling the switching of bidirectional switches on the basis of the output voltage and/or input voltage.

30. The method of claim 29, further including the step of controlling the switching frequency of the bidirectional switches in dependence upon the output of the cyclo-converter.

31. The method of claim 29, further including the step of controlling a switching sequence of the bidirectional switches to predominantly switch in order of the phase having the greatest absolute voltage, followed by the phase having the middle absolute voltage followed by the phase having the lowest absolute voltage.

* * * * *